United States Patent [19]

Hanson

[11] Patent Number: 4,484,327
[45] Date of Patent: Nov. 20, 1984

[54] PULSE CODE MODULATION RATE CONVERTER

[75] Inventor: Elis D. Hanson, Eatontown, N.J.

[73] Assignee: The United States of America as represented by the Secretary of the Army, Washington, D.C.

[21] Appl. No.: 490,948

[22] Filed: May 2, 1983

[51] Int. Cl.³ .................... H04B 12/02; H04J 3/07
[52] U.S. Cl. .................................... 370/84; 370/102; 375/112
[58] Field of Search ............... 370/84, 102; 375/112, 375/122; 381/30, 31, 32, 34, 35

[56] References Cited

U.S. PATENT DOCUMENTS 3,711,650  1/1973  Kuhn et al. ................... 370/84
4,025,720  5/1977  Pachynski, Jr. ............... 370/102
4,151,373  4/1979  Widmer et al. ............... 370/102

Primary Examiner—Joseph A. Orsino, Jr.
Attorney, Agent, or Firm—Anthony T. Lane; Sheldon Kanars; Jeremiah G. Murray

[57] ABSTRACT

A pulse code modulation rate converter is described for interfacing into a communication system, apparatus designed for operation at two different, and specific, transmission rates.

6 Claims, 4 Drawing Figures

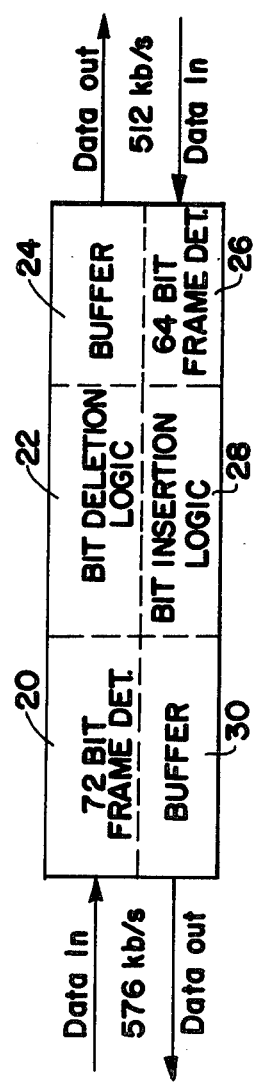

PULSE CODE MODULATION RATE CONVERTER (The invention described herein may be manufactured, used, and licensed by or for the Government for Governmental purposes without the payment of any royalties thereon.)

FIELD OF THE INVENTION

This invention relates to multichannel digital communication systems and, more particularly, to a pulse rate converter which permits interfacing of two communications equipments which are designed for operation at different group transmission rates.

BACKGROUND OF THE INVENTION

As is known and understood, advances in technical knowledge often bring about re-designs of existing equipment to result in improved operation, simplicity in construction, and/or reductions in cost—amongst other advantages. In 12 channel pulse code modulation, time division multiplex communications systems, for example, such technical advances have led to development of equipment which operates at a 512 kb/s transmission rate, as compared with previous designs operating at 576 kb/s rate. Typical of such multichannel digital communictions equipments are the Army Tactical Communications Systems full duplexing transmitting equipment designated as the TD-660 (576 kg/s group rate) and the Air Force designed AN/TRC-170 tropo scatter radio terminal (512 kb/s group rate). Rather than discard all existing TD-660 units and supplanting them with replacements which operate at the 512 kb/s rate, it would be far more desirable to continue to utilize them, and as they already presently exist, but in the newly developing 512 kb/s group transmission context. One problem in doing so, however, is the incompatability which exists because of the differing group traffic rates.

SUMMARY OF THE INVENTION

As will be seen from the description that follows, the apparatus of the present invention is adapted for installation at such a tropo scatter radio facility (i.e., operative at 512 kb/s rate) and designed to accommodate the trunking system of the full duplexing system (i.e., 576 kb/s rate). As will be seen, at one end of the rate converter link, the 72 bit frame associated with the higher rate transmission is converted to the 64 bit frame associated with 512 kb/s transmissions. Such "down-conversion" is followed at the other end of the link, to re-convert the 512 kb/s signal to the 576 kb/s rate. As is described, such "up-conversion" follows from an insertion of "dummy" bits in those locations in which "data" bits were removed in going from the 72 bit frame to the 64 bit frame of the "down-conversion". Analysis has shown that the interfacing which results between the two previously incompatible equipments introduces only tolerably small error rates and losses in signal-to-quantizing noise ratio. Thus, as contrasted with other technical advances, the rate converter of the present invention will be seen effective in solving the existent bit rate incompatibility problem, yet without introducing significant further problems of its own.

BRIEF DESCRIPTION OF THE DRAWING

These and other features of the present invention will be more clearly understood from a consideration of the following description, taken in connection with the accompanying drawing, in which:

FIGS. 1a–1c show frame formats for a multichannel digital communication system helpful in an understanding of the present invention; and FIG. 2 is a functional block diagram of the rate converter according to the invention.

DETAILED DESCRIPTION OF THE DRAWING

The frame format for the 12 channel pulse code modulation, time division multiplex terminal TD-660 is as illustrated in FIG. 1a. As will be seen the frame is 72 bits long, subdivided into 12 groups 6 bits each. The first bit in each 6 bit group (e.g. bits 1, 7, 13, 19, 25, etc.) is the most significant bit (MSB) for that particular channel, while the sixth bit in each 6 bit group (e.g. bits 6, 12, 18, 24, etc.) is the least significant bit (LSB). In such frame format, the LSB of Channel 12 (i.e., bit 72) is reserved for framing synchronization, whereas the LSB of Channel 1 (i.e., bit 6) is reserved for synchronization flagging. With the transmission rates at 8,000 frames per second, the synchronization information of Channels 1 and 12 remain undisturbed, and cannot be tampered with.

In accordance with the operation of the rate converter of the invention, the first step in its sequencing is to locate the end of a frame of the 576 kb/s stream, namely bit 72. The converter then operates through appropriate logic circuitry to count off the next twelve bits (bits 1–12 of the succeeding frame), deleting the 12th bit counted (i.e., the LSB of Channel 2). The logic then counts off another six bits, deleting bit 18 (i.e., the LSB of Channel 3). Such process of counting off six additional bits, and deleting the 6th bit so counted, then continues until the LSBs of the following six channels are removed (i.e., bits 24, 30, 36, 42, 48, 54). The result of such logic sequencing is a reduction of 8 bits in the overall frame length, yielding a 64 bit frame as shown in FIG. 1b.

Because the frame rate remains at 8 kb/s, the transmission rate for a 64 bit frame is thus reduced to $64 \times 8 \times 10^3$, or 512 kb/s.

With a 576 kb/s transmission rate full duplexing communications equipment being operated in field use, incorporation of such a rate converter at a shelter terminal, e.g., the tropo scatter radio terminal, operative at 512 kb/s rate, can continue as part of the intermediary communications link. While such "down-conversion" is effective in making so far compatible the two rate equipments, complete operation requires an "up-conversion" from the shelter terminal to the full duplexing equipment in the field to the 576 kb/s pulse rate at which it is designed to operate.

To accomplish such rate conversion, non-information carrying "dummy" bits are re-inserted by digital logic circuitry at the LSBs locations of Channels 2–9, inclusive. The resulting frame format from the main terminal link is as shown in FIG. 1c, wherein the designation "D" identifies the "dummy" bit re-inserted—the designations "F" and "X" identifying, as in FIGS. 1a and 1b, cryptographic synchronization flag bit and pulse code modulation synchronization bit information, respectively.

Although the re-constituted signal output to the full duplexing equipment in field usage would continue at the 576 kb/s transmission rate, a loss in signal-to-quantizing noise will be seen to have been suffered in those pulse code modulated channels in which bits have been deleted. As will be understood, this follows from having a 5 bit pulse code modulation encoding in Channels 2–8, instead of the prior 6 bit encoding. Experimentation has shown, however, that the loss experienced is tolerably low. Channels carrying digital data, rather than pulse code modulated converted analog signals, experience no degradation whatever due to the process, because the information carried on such channels occupies no more than the first 5 bits of these channels.

Analysis has also shown that the presence of the eight "dummy" pulses do not produce a sufficient error rate to affect synchronization of the reconstructed 576 kb/s transmission stream.

FIG. 2 illustrates a functional block diagram of the 576-512-576 kb/s conversion which take place at the main terminal, such as the AN/TRC-170 tropo scatter radio terminal. A 72 bit frame detector 20 receives the input data at the 576 kb/s rate, for coupling to the bit deletion logic 22, whereat the eight LSBs are dropped. A buffer 24 provides the storage for these bits as part of the signal processing and holding of at least one frame of data for the signal operation to occur. The output stream, at the 512 kb/s rate is then applied to a 64 bit frame detector 26 for synchronization and ultimate re-insertion of the "dummy" bits in the bit insertion logic unit 28. A further buffer 30 then stores the re-constituted signal for transmission to the field equipment—e.g., the TD-660 multiplexer—at its desired 576 kb/s rate.

As will be readily understood, with such rate conversion, the previously incompatible equipments can then operate together by means of the intermediary rate conversion. And, in this manner, dated equipments designed for operation at 576 kb/s transmission rates can continue to be used effectively, even though advanced designs for communications linkage terminals mandate operations at multiple and/or sub-multiples thereof.

While there has been described what is considered to be a preferred embodiment of the present invention, it will be understood that modifications can be made without departing from the scope of the teachings herein. For example, although particularly set forth in the context of a rate conversion from 576 kb/s to a 512 kb/s system, and back again, the sequencing employed can find use equally as well in converting, for example, 1152 kb/s equipment groups into 1024 kb/s main terminal groups—although the signal processing then involves the de-multiplexing of two twelve channel pulse code modulation groups into two separate 576 kb/s streams. The rate converter of the invention can similarly be used in the manner set forth above, with the output then being recombined for adding the two streams into the desired 1024 kb/s stream needed for the main terminal equipment.

As will be appreciated, the 576-512-576 kb/s conversion is but a specialized case for a pulse code modulation, time division multiplex communications system in which 12, 6-bit channels are communicated at an eight kHz frame rate. A total of 8 bits are deleted in the conversion, reducing the frame from a 72-bit frame to one of 64 bits. In a more generalized manner, the group transmission rate of a multi-channel pulse code modulated system would equal the product of the number of bits per channel (X) times the number of channels per frame (Y) times the frame frequency (Z). The "downward conversion" to a second group transmission rate would follow from the overall reduction in the total number of bits per frame, equal to (S+1) wherein "S" equals the number of successive bit deletions beyond the 12th counted bit following the end-of-frame detection of bit 72. As will be seen, for the specific example set forth above, "S"=7—whereas if only four additional bits were deleted, the "downward conversion" could be changed from 576 kb/s to 536 kb/s; if "S"=9, however, then the new group transmission rate would equal 560 kb/s. By providing an "upward-conversion" of comparable design, it will be seen that the invention, as described, could serve to make compatible any conbination of two differing rate systems that previously could not work together.

For at least such reason, therefore, resort should be had to the claims appended hereto for a correct understanding of the invention.

I claim:

1. A rate converter, comprising:
   first means for supplying multi-channel pulse code modulated signals of X bits per each of Y channels, and at a given frame frequency Z, so as to exhibit a first group transmission rate;
   second means for detecting the least significant bit of the last channel of a frame;
   third means for counting 2X bits from said detected least significant bit and for deleting from said frame such information bit as there located;
   fourth means for counting X additional bits from said bit delete location in successive sequentials S, and for delecting from said frame each such information bit present at each such additional locations, "S" being a number 0, 1, 2, 3, etc. selected in accordance with a second group transmission rate to which said multi-channel pulse code modulation signals are to be converted;
   fifth means, operational at said second group transmission rate, for processing such information bits as remain in said frame;
   sixth means for detecting the least significant bit of the last channel of said frame as processed at said second group transmission rate;
   seventh means for counting 2X bits from said detected processed least significant bit and for inserting thereat a first non-informational dummy signal;
   eighth means for counting X additional bits from said dummy bit insertion location in successive sequentials S, and for inserting further non-informational dummy signals at each such location in reconverting said multi-channel pulse code modulation signals to said first group transmission rate; and
   ninth means for providing said re-converted signals as an output of said rate converter.

2. The pulse rate converter of claim 1 wherein X=6.

3. The pulse rate converter of claim 1 wherein Y=12.

4. The pulse rate converter of claim 1 wherein Z=8 kb/sec.

5. The pulse rate converter of claim 1 wherein X=6, Y=12 and Z=8 kb/sec to exhibit a first group transmission rate of 576 kb/sec.

6. The pulse rate converter of claim 1 wherein S=7 to provide a second group transmission rate of 512 kb/sec.

* * * * *